United States Patent
Sloupensky et al.

(10) Patent No.: US 9,896,785 B2
(45) Date of Patent: Feb. 20, 2018

(54) DISTRIBUTION SYSTEM FOR A WETTING LIQUID FOR SPINNING NOZZLES OF AN AIR-JET SPINNING MACHINE

(71) Applicant: Rieter CZ s.r.o., Usti nad Orlici (CZ)

(72) Inventors: Jiri Sloupensky, Usti nad Orlici (CZ); Jiri Stancl, Usti nad Orlici (CZ)

(73) Assignee: Rieter CZ s.r.o., Usti nad Orlici (CZ)

( * ) Notice: Subject to any disclaimer, the term of this patent is extended or adjusted under 35 U.S.C. 154(b) by 0 days.

(21) Appl. No.: 15/374,362

(22) Filed: Dec. 9, 2016

(65) Prior Publication Data

US 2017/0167057 A1 Jun. 15, 2017

(30) Foreign Application Priority Data

Dec. 9, 2015 (CZ) .................. PUV 2015-31863

(51) Int. Cl.
| | |
|---|---|
| *D01H 4/02* | (2006.01) |
| *C02F 1/32* | (2006.01) |
| *D01H 1/115* | (2006.01) |
| *B29C 47/08* | (2006.01) |
| *B29C 47/10* | (2006.01) |
| *C02F 103/02* | (2006.01) |
| *B29K 67/00* | (2006.01) |

(52) U.S. Cl.
CPC ......... *D01H 1/115* (2013.01); *B29C 47/0877* (2013.01); *B29C 47/1018* (2013.01); *C02F 1/325* (2013.01); *D01H 4/02* (2013.01); *B29K 2067/00* (2013.01); *C02F 2103/02* (2013.01); *C02F 2201/32* (2013.01); *C02F 2303/04* (2013.01)

(58) Field of Classification Search
CPC .............. C02F 2303/04; C02F 2103/02; C02F 2201/3222; C02F 2307/14; D01H 4/02
USPC ........ 250/453.11, 455.11; 242/364.9; 57/404
See application file for complete search history.

(56) References Cited

U.S. PATENT DOCUMENTS

| | | | |
|---|---|---|---|
| 6,201,602 B1 * | 3/2001 | Bouvyn ............. | G01N 21/8915 356/238.1 |
| 9,376,333 B2 * | 6/2016 | Boodaghians .......... | C02F 1/325 |
| 2003/0070414 A1 * | 4/2003 | Pohn ....................... | D01H 4/10 57/404 |
| 2014/0034770 A1 * | 2/2014 | Sloupensky ........... | B65H 51/22 242/364.9 |
| 2017/0167057 A1 * | 6/2017 | Sloupensky ........... | D01H 1/115 |

* cited by examiner

*Primary Examiner* — David A Vanore
(74) *Attorney, Agent, or Firm* — Dority & Manning, P.A.

(57) ABSTRACT

A distribution system for a wetting liquid supplied to spinning nozzles of an air-jet spinning machine includes a supply pipe for the wetting liquid supplied to the spinning nozzles. At least one UV light emitting diode is arranged in the supply pipe, wherein the UV radiation emitted by the UV light emitting diode passes through the wetting liquid to disinfect the wetting liquid.

5 Claims, 1 Drawing Sheet under each of them a dispensing device 4 of the wetting liquid 1 is mounted.

DISTRIBUTION SYSTEM FOR A WETTING LIQUID FOR SPINNING NOZZLES OF AN AIR-JET SPINNING MACHINE

TECHNICAL FIELD

The technical solution relates to a distribution system of a wetting liquid for the spinning nozzles of an air-jet spinning machine comprising a plurality of workstations for spinning yarn from a fiber bundle, the workstations being arranged next to each other.

BACKGROUND ART

When processing certain fibrous materials on air-jet spinning machines, for example polyester, it is necessary to moisten the fibrous material in the spinning nozzle or before entering the spinning nozzle. Therefore, a required amount of a wetting fluid, usually water, is supplied to the spinning nozzle. However, the consumption of the wetting liquid during spinning is very low, in the order of tenths of ml/min, and it is not continuous because the wetting liquid is supplied only during spinning and spinning-in. Given the low consumption of the wetting liquid, there is a risk of the occurrence and propagation of bacteria in the distribution system, and it is therefore necessary to provide cleaning and/or disinfection of the wetting liquid so that the wetting liquid entering the spinning nozzle will be hygienically harmless, since its residues, such as aerosol, are dispersed into the environment of the spinning factory. This is currently done by adding various disinfecting chemicals, such as the disinfectant known under the trade name "Sanosil" by Sanosil AG, Switzerland, before the wetting liquid enters the humidifying system of the machine, or, to be more specific, by supplying it to the reservoir of the wetting liquid, which is arranged before the humidifying system. The disadvantages of the chemical disinfection of the wetting liquid include the costs of disinfecting chemicals and the oxidation of the liquid in the humidifying system, causing the formation of bubbles, which subsequently cause interruption of the supply of the wetting liquid to the spinning nozzle, which can negatively affect the quality of the produced yarn.

SUMMARY OF THE INVENTION

A goal of the proposed technical solution according to the invention is to provide the disinfection of the wetting liquid without the need to use additional chemicals and without a risk of bubble formation. Additional objects and advantages of the invention will be set forth in part in the following description, or may be obvious from the description, or may be learned through practice of the invention.

The goal of the technical solution is achieved by a distribution system of a wetting liquid to the spinning nozzles of an air-jet spinning machine, whose principle consists in that in the supply pipe of the wetting liquid is arranged at least one ultraviolet light emitting diode for the disinfection of the wetting liquid, whereby the UV radiation emitted by the light emitting diode passes through the wetting liquid. This arrangement provides ecological disinfection with low energy costs and without the need for additional chemicals. The UV light emitting diode may be arranged at each workstation and if its performance is sufficiently high, there may be even one UV light emitting diode common to two or more adjacent workstations.

In the system of the wetting liquid supply the UV light emitting diode can be situated before a dispensing device of the wetting liquid or between the dispensing device and the spinning nozzle.

BRIEF DESCRIPTION OF DRAWINGS

Exemplary embodiments of the technical solution are schematically represented in the enclosed drawing, where.

DETAILED DESCRIPTION

Figure 1:
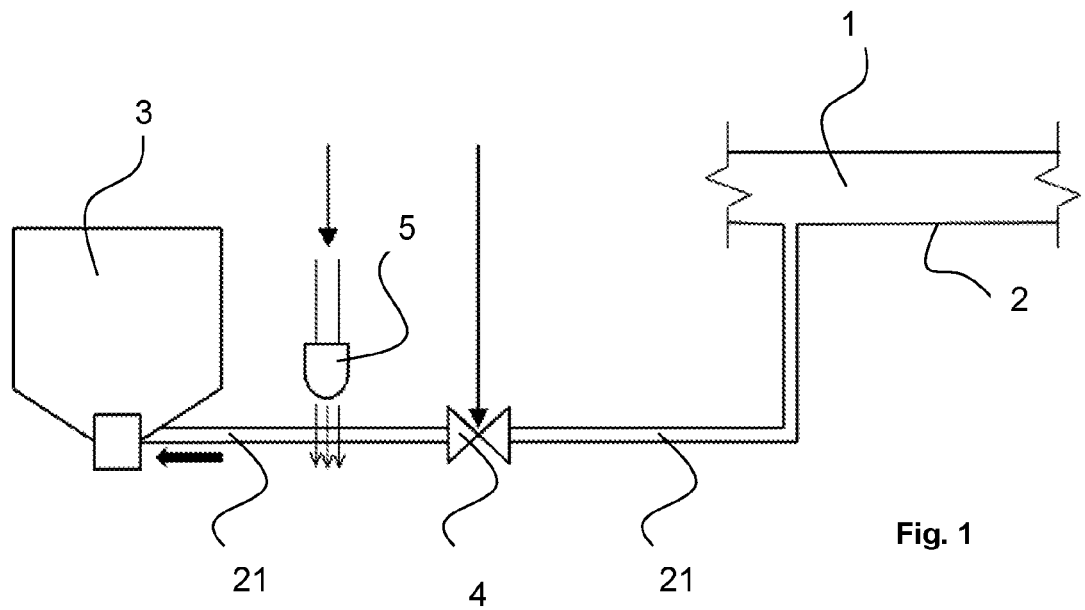
FIG. 1 shows the first variant of an arrangement with an UV light emitting diode between the dispensing device of the wetting liquid and the spinning nozzle.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

In an exemplary embodiment according to FIG. 1, a wetting liquid 1 is distributed by a distribution system 2 of the wetting liquid to spinning nozzles 3 of individual workstations of an air-jet spinning machine. A supply pipe 21 for the wetting liquid 1 leads into a spinning nozzle 3 of each workstation, whereby in the supply pipe 21 is mounted a dispensing device 4 of the wetting liquid 1. In the supply pipe 21 between the dispensing device 4 of the wetting liquid 1 and the spinning nozzle 3 is arranged at least one UV light emitting diode 5, whose radiation passes through the wetting liquid 1. The most effective diode for the purpose of disinfection appears to be a diode with emission wavelengths UV-C, that is between 290 and 100 nm, whereby the wavelengths between 250 and 290 nm have been proven to be preferable for water disinfection. The radiation is absorbed by the DNA of microorganisms or by the RNA of viruses, which causes disruption of the DNA or RNA structure and thereby even deactivation of the affected microorganism or virus.

The UV light emitting diode 5 is arranged, for example, in a wall of the supply pipe 21 and its radiating wall is in direct contact with the wetting liquid 1, which is being disinfected by the complete transmission of UV radiation to the wetting liquid 1 with the highest possible disinfecting effect.

In an unillustrated embodiment, the UV light emitting diode 5 is located in a body made of a material permeable to UV radiation, whereby in the body there is an orifice for the passage of the wetting liquid 1 and the body is inserted into the supply pipe 21 of the wetting liquid 1.

Figure 2:
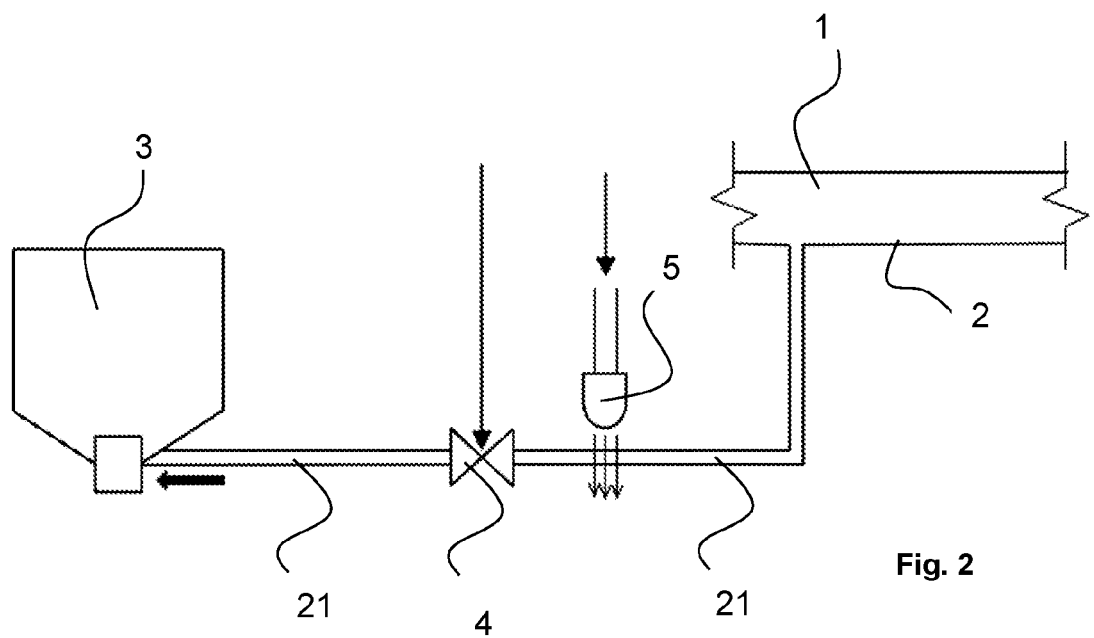
FIG. 2 represents the second variant of an arrangement of an UV light emitting diode before the dispensing device.

In an embodiment according to FIG. 2, the UV light emitting diode 5 is located before the dispensing device 4 of the wetting liquid 1, and so the wetting liquid 1 entering the dispensing device 4 has been already disinfected.

In an unillustrated embodiment, the UV light emitting diode 5 is common to two adjacent workstations. From the main channel of the distribution system 2 of the wetting liquid, leads the supply pipe of the wetting liquid 1 for two adjacent workstations, or for more adjacent workstations, or for more workstations, which subsequently branches into supply pipes 21 leading to the spinning nozzles 3, in which is arranged a dispensing device 4 of the wetting liquid 1. The UV light emitting diode 5 is arranged in the common portion of the supply pipe of the wetting liquid 1 before it branches into the supply pipes 21 leading to the spinning nozzles 3.

The distribution system according to the proposed technical solution is intended to ensure hygiene in spinning factories with air-jet spinning machines, where it prevents the spread of harmful microorganisms and viruses, and ensures safe hygienic conditions for the machine operators. At the same time, the system reduces the formation of bubbles in the distribution system, which occurs due to the oxidation of disinfecting agents, and thus helps to increase machine reliability and improve the quality of the produced yarn.

Modifications and variations can be made to the embodiments illustrated or described herein without departing from the scope and spirit of the invention as set forth in the appended claims.

The invention claimed is:

1. A distribution system for a wetting liquid supplied to spinning nozzles of an air-jet spinning machine,
   comprising a supply pipe for the wetting liquid supplied to the spinning nozzles;
   at least one UV light emitting diode arranged in the supply pipe, wherein the UV radiation emitted by the UV light emitting diode passes through the wetting liquid to disinfect the wetting liquid.

2. The distribution system according to claim 1, wherein the air-jet spinning machines comprises a plurality of workstations, each workstation comprising one of the spinning nozzle, the system comprising one of the UV light emitting diodes arranged at each workstation.

3. The distribution system according to claim 1, wherein the air-jet spinning machines comprises a plurality of workstations, each workstation comprising one of the spinning nozzle, wherein the UV light emitting diode is common to a plurality of the workstations.

4. The distribution system according to claim 1, wherein the UV light emitting diode is arranged in the supply pipe before a dispensing device in a direction of flow of the wetting liquid through the supply pipe.

5. The distribution system according to claim 1, wherein the UV light emitting diode is arranged in the supply pipe between a dispensing device and one of the spinning nozzles in a direction of flow of the wetting liquid through the supply.

\* \* \* \* \*